United States Patent
Sobel et al.

(10) Patent No.: US 10,169,577 B1
(45) Date of Patent: Jan. 1, 2019

(54) SYSTEMS AND METHODS FOR DETECTING MODIFICATION ATTACKS ON SHARED PHYSICAL MEMORY

(71) Applicant: Symantec Corporation, Mountain View, CA (US)

(72) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/471,489

(22) Filed: Mar. 28, 2017

(51) Int. Cl.
| | | |
|---|---|---|
| G06F 21/55 | (2013.01) | |
| G06F 3/06 | (2006.01) | |
| G06F 21/53 | (2013.01) | |
| G06F 9/455 | (2018.01) | |

(52) U.S. Cl.
CPC .......... *G06F 21/552* (2013.01); *G06F 3/0623* (2013.01); *G06F 3/0644* (2013.01); *G06F 3/0652* (2013.01); *G06F 3/0673* (2013.01); *G06F 9/45533* (2013.01); *G06F 21/53* (2013.01); *G06F 2221/034* (2013.01)

(58) Field of Classification Search
CPC .... G06F 21/552; G06F 9/45533; G06F 21/53; G06F 3/0644; G06F 3/0652; G06F 3/0623; G06F 3/0673; G06F 2221/034
See application file for complete search history.

(56) References Cited

U.S. PATENT DOCUMENTS

| | | | | |
|---|---|---|---|---|
| 7,814,149 | B1 * | 10/2010 | Stringham | G06F 17/30156 707/758 |
| 8,589,406 | B2 * | 11/2013 | Lillibridge | G06F 17/30371 707/696 |
| 9,203,862 | B1 * | 12/2015 | Kashyap | H04L 63/145 |
| 2007/0294496 | A1 * | 12/2007 | Goss | G06F 12/1408 711/163 |
| 2010/0031360 | A1 * | 2/2010 | Seshadri | G06F 21/57 726/24 |
| 2011/0131568 | A1 * | 6/2011 | Heim | G06F 9/4856 718/1 |
| 2013/0091578 | A1 * | 4/2013 | Bisht | G06F 21/53 726/25 |
| 2013/0132690 | A1 * | 5/2013 | Epstein | G06F 12/1416 711/159 |

(Continued)

*Primary Examiner* — Robert B Leung
*Assistant Examiner* — Thomas Ho
(74) *Attorney, Agent, or Firm* — Fisher Broyles, LLP

(57) ABSTRACT

The disclosed computer-implemented method for detecting modification attacks on shared physical memory may include (i) identifying a page frame of physical memory that is shared by a plurality of virtual machines, (ii) calculating a first checksum for the page frame, (iii) calculating, while the page frame is shared by the plurality of virtual machines and before any of the plurality of virtual machines writes to a page of virtual memory that is mapped to the page frame, a second checksum for the page frame, (iv) detecting a modification attack (such as a rowhammer attack) on the page frame by one of the plurality of virtual machines by detecting that the first checksum does not equal the second checksum, and (v) performing a security action in response to detecting the modification attack. Various other methods, systems, and computer-readable media are also disclosed.

20 Claims, 9 Drawing Sheets

(56) References Cited

U.S. PATENT DOCUMENTS

| | | | |
|---|---|---|---|
| 2014/0281805 A1* | 9/2014 | Sah | G11C 29/42 714/764 |
| 2014/0372717 A1* | 12/2014 | Ciu | G06F 21/53 711/162 |
| 2015/0319160 A1* | 11/2015 | Ferguson | H04L 9/0894 726/10 |
| 2016/0099951 A1* | 4/2016 | Kashyap | H04L 63/145 726/23 |
| 2017/0123879 A1* | 5/2017 | Donlin | G06F 11/0727 |
| 2017/0147224 A1* | 5/2017 | Kumar | G06F 3/0608 |

* cited by examiner

SYSTEMS AND METHODS FOR DETECTING MODIFICATION ATTACKS ON SHARED PHYSICAL MEMORY

BACKGROUND

Today, many computational workloads are performed by virtual machines in shared-computing environments (e.g., cloud-computing environments). In typical shared-computing environments, several virtual machines may run in isolation from one another yet use the same physical resources. The sharing of physical resources by virtual machines often results in significant reductions in the amount of physical resources (e.g., physical hardware, rack space, and cooling) that must be allocated to run many conventional computational workloads.

In a typical shared-computing environment, virtual machines may be allocated virtual memory in amounts that exceed the amount of available physical memory (a concept that is often referred to as memory overcommitment). Overcommitment of memory may be possible since (i) a typical virtual machine does not use all the virtual memory that has been allocated to it and (ii) unused virtual memory may not consume physical memory. Overcommitment of memory may also be possible because one or more pages of virtual memory of two or more virtual machines may, in some circumstances, share or be mapped to the same page frame in physical memory.

In many shared-computing environments, virtual machines often execute the same operating systems, run the same applications, and/or process the same data such that one or more pages of virtual memory of the virtual machines may contain identical data. To reduce the amount of physical memory that is used by the virtual machines, some shared-computing environments may monitor physical memory for identical page frames and, when identical page frames are detected, de-duplicate the identical page frames by (i) retaining one of the page frames as read-only memory, (ii) remapping the pages of virtual memory that were mapped to the other page frames to the retained page frame, and (iii) releasing the other page frames. If a virtual machine attempts to write data to a page of virtual memory that is backed by a shared page frame in physical memory, a typical shared-computing environment may use a copy-on-write mechanism that remaps the page of virtual memory to a new duplicate page frame in physical memory before committing the virtual machine's write to physical memory.

Unfortunately, recent discoveries of the Rowhammer dynamic random-access memory (DRAM) bug that plagues some types of physical memory and its associated exploits (e.g., Flip Feng Shui) have caused many shared-computing providers to forgo physical-memory de-duplication. The Rowhammer DRAM bug generally refers to a hardware bug that plagues certain types of DRAM whose row-based configurations are flawed in such a way that repeated read accesses from one physical row of memory may induce bit flips (i.e., single bit errors) in adjacent physical rows of memory. Malicious attacks based on this flaw are often referred to as modification attacks. In conventional shared-computing environments, a malicious virtual machine may use a modification attack to induce a bit flip in a page of virtual memory of a target virtual machine that is mapped to a shared page frame and that contains data that is sensitive to bit flips. The instant disclosure, therefore, identifies and addresses a need for systems and methods for detecting rowhammer attacks and other modification attacks on shared physical memory.

SUMMARY

As will be described in greater detail below, the instant disclosure describes various systems and methods for detecting rowhammer attacks and other modification attacks on shared physical memory. In one example, a method for detecting modification attacks on shared physical memory may include (i) identifying a page frame of physical memory that is shared by a plurality of virtual machines (i.e., a page of virtual memory of each of the plurality of virtual machines is mapped to the page frame), (ii) calculating a first checksum for the page frame, (iii) calculating, while the page frame is shared by the plurality of virtual machines and before any of the plurality of virtual machines writes to a page of virtual memory that is mapped to the page frame, a second checksum for the page frame, (iv) detecting a modification attack (e.g., a rowhammer attack) on the page frame by one of the plurality of virtual machines by detecting that the first checksum does not equal the second checksum, and (v) performing a security action in response to detecting the modification attack.

In some examples, the step of performing the security action may include (i) flagging each of the plurality of virtual machines as a possible perpetrator of the modification attack, (ii) flagging each of the plurality of virtual machines for forensic examination, (iii) shutting down each of the plurality of virtual machines, (iv) unsharring the page frame, (v) preventing each of the plurality of virtual machines from sharing physical memory with any other virtual machine, (vi) assigning each of the plurality of virtual machines to a group of untrusted virtual machines that cannot share physical memory with trusted virtual machines, and/or (vii) monitoring each of the plurality of virtual machines for rowhammer-attack behaviors.

In some examples, the step of calculating the first checksum may be performed as part of de-duplicating the page frame. In at least one example, the page frame may be subject to copy-on-write divergence while the page frame is shared by the plurality of virtual machines.

In one embodiment, a system for detecting modification attacks on shared physical memory may include several modules stored in memory, including (i) an identifying module that identifies a page frame of physical memory that is shared by a plurality of virtual machines (i.e., a page of virtual memory of each of the plurality of virtual machines is mapped to the page frame), (ii) a calculating module that (a) calculates a first checksum for the page frame and (b) calculates, while the page frame is shared by the plurality of virtual machines and before any of the plurality of virtual machines writes to a page of virtual memory that is mapped to the page frame, a second checksum for the page frame, (iii) a detecting module that detects a modification attack on the page frame by one of the plurality of virtual machines by detecting that the first checksum does not equal the second checksum, and (iv) a security module that performs a security action in response to detecting the modification attack. The system may also include at least one physical processor that executes the identifying module, the calculating module, the detecting module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a page frame of physical memory that is shared by a plurality of virtual machines (i.e., a page of virtual memory of each of the plurality of virtual machines is mapped to the page frame), (ii) calculate a first checksum for the page frame, (iii) calculate, while the page frame is shared by the plurality of virtual machines and before any of the plurality of virtual machines writes to a page of virtual memory that is mapped to the page frame, a second checksum for the page frame, (iv) detect a modification attack on the page frame by one of the plurality of virtual machines by detecting that the first checksum does not equal the second checksum, and (v) perform a security action in response to detecting the modification attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
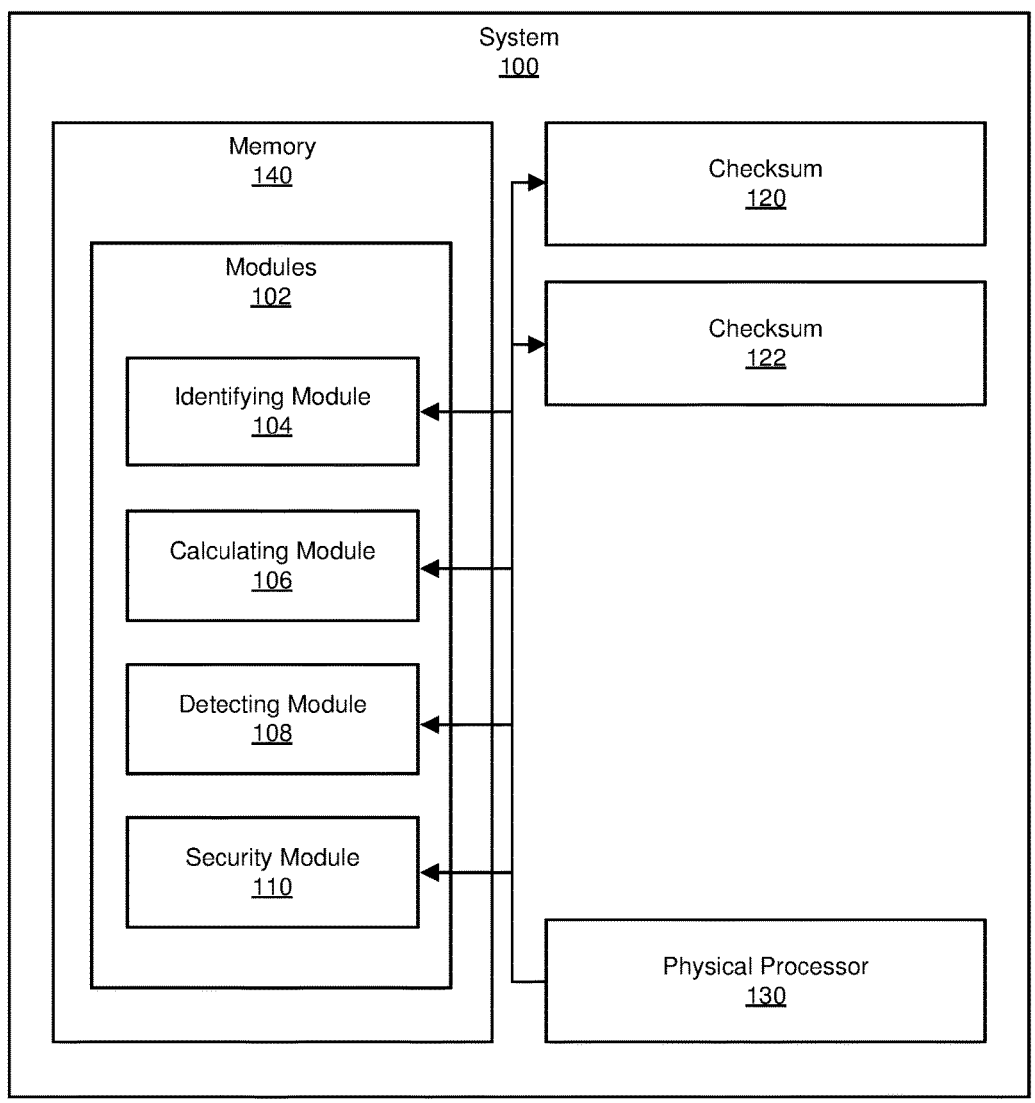
FIG. 1 is a block diagram of an example system for detecting modification attacks on shared physical memory.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting modification attacks on shared physical memory. As will be explained in greater detail below, by periodically calculating checksums of the read-only contents of a shared page frame in physical memory (i.e., a page frame in physical memory that is shared by multiple virtual machines and that has been marked as read-only memory) to monitor the shared page frame for changes caused by rowhammer-induced bit flips, the systems and methods described herein may enable the detection of modification attacks, such as rowhammer attacks, that are able to modify the read-only contents of shared page frames in physical memory without writing to the shared page frames. Furthermore, in some examples, by detecting bit flips in shared page frames in physical memory soon after the bit flips occur, these systems and methods may perform various security actions that may prevent in-progress modification attacks from being carried out successfully.

In addition, the systems and methods described herein may improve the functioning of a computing device (e.g., a hypervisor) by enabling the computing device to safely de-duplicate page frames in physical memory and thus reducing the amount of physical memory that is consumed by the computing device at any given time. These systems and methods may also improve the field of virtualized computing by reducing the amount of physical memory that is needed to safely and securely host virtual machines in shared-computing environments. Embodiments of the instant disclosure may also provide various other advantages and features, as discussed in greater detail below.

The following will provide, with reference to FIGS. 1-6, detailed descriptions of example systems for detecting modification attacks on shared physical memory. Detailed descriptions of corresponding computer-implemented methods will also be provided in connection with FIG. 7. In addition, detailed descriptions of an example computing system and network architecture capable of implementing one or more of the embodiments described herein will be provided in connection with FIGS. 8 and 9, respectively.

FIG. 1 is a block diagram of an example system 100 for detecting modification attacks on shared physical memory. As illustrated in this figure, example system 100 may include one or more modules 102 for performing one or more tasks. As will be explained in greater detail below, modules 102 may include an identifying module 104, a calculating module 106, a detecting module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting modification attacks on shared physical memory. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more checksums, such as checksums 120 and 122. Checksums 120 and 122 generally represent any type or form of fingerprint, hash, output of a hash function, and/or other unique representation of a block of data that is derived from the block of data. In one example, checksums 120 and 122 may be MD5 hash values or Secure-Hash-Algorithm (SHA) hash values.

Figure 2:
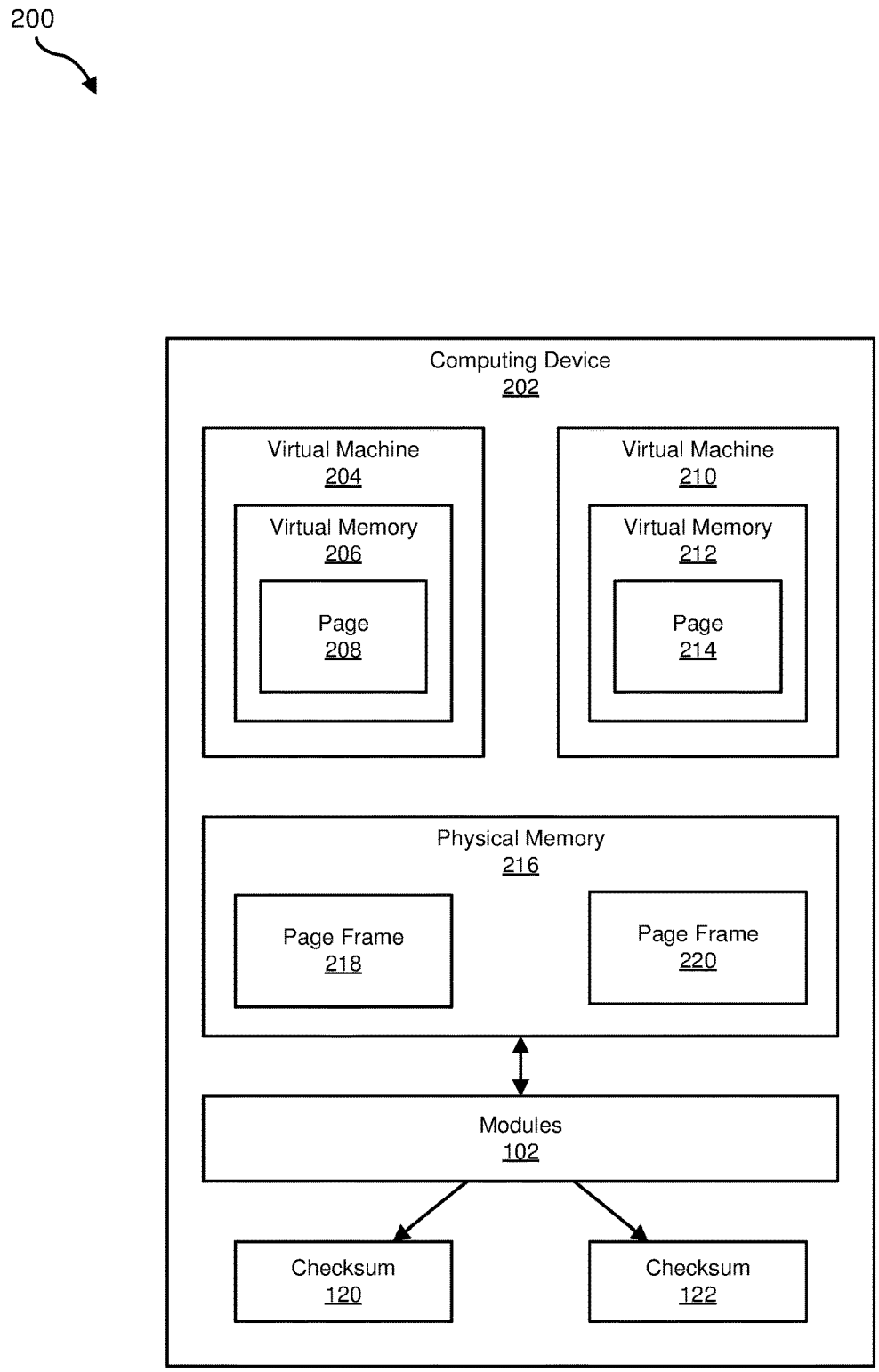
FIG. 2 is a block diagram of an additional example system for detecting modification attacks on shared physical memory.
Figure 4:
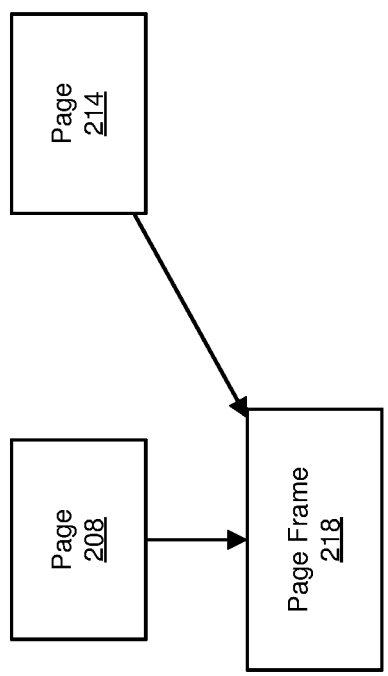
FIG. 4 is a block diagram of an example mapping of virtual memory pages to physical memory.

Example system 100 in FIG. 1 may be implemented in a variety of ways. For example, all or a portion of example system 100 may represent portions of example shared-computing system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to detect modification attacks. For example, and as will be described in greater detail below, one or more of modules 102 may cause computing device 202 to (i) identify a page frame 218 of physical memory 216 that is shared by virtual machines 204 and 210 (as shown in FIG. 4), (ii) calculate a first checksum 120 for page frame 218, (iii) calculate, while page frame 218 is shared by virtual machines 204 and 210 and before virtual machine 204 writes to page 208 or virtual machine 210 writes to page 214, a second checksum 122 for page frame 218, (iv) detect a modification attack on page frame 218 by either virtual machine 204 or virtual machine 210 by detecting that checksum 120 does not equal checksum 122, and (v) perform a security action in response to detecting the modification attack.

Computing device 202 generally represents any type or form of computing device capable of reading computer-executable instructions. In one example, computing device 202 may represent a hypervisor. As used herein, the term "hypervisor" generally refers to any type or form of virtualization platform capable of running and/or managing multiple virtual machines on a single physical computing device. Examples of hypervisors include, without limitation, VMWARE ESX/ESXI, MICROSOFT HYPER-V, ORACLE VM, SUN VIRTUALBOX, CITRIX XEN-SERVER, any bare-metal hypervisor, and/or any hosted hypervisor. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device on which memory de-duplication may be performed. Additional examples of computing device 202 include, without limitation, security servers, application servers, web servers, storage servers, and/or database servers configured to run certain software applications and/or provide various security, web, storage, and/or database services. Although illustrated as a single entity in FIG. 2, computing device 202 may include and/or represent a plurality of computing devices that work and/or operate in conjunction with one another.

As shown in FIG. 2, computing device 202 may be configured to host multiple virtual machines, such as virtual machine 204 and virtual machine 210. Virtual machines 204 and 210 generally represent any virtualization (including hardware-assisted virtualization), implementation, or emulation of a physical computing device. Examples of virtual machines 204 and 210 include, without limitation, system virtual machines and process virtual machines.

Figure 3:
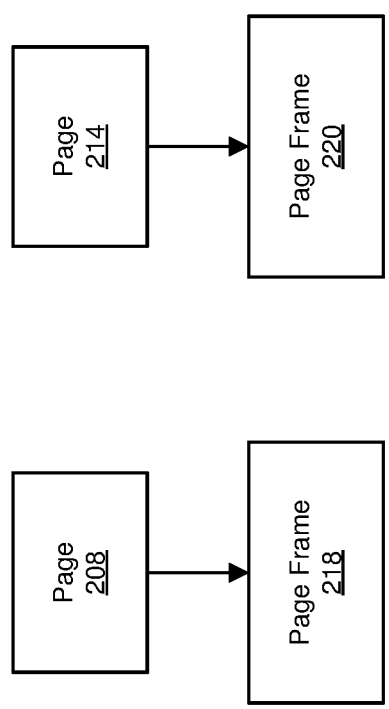
FIG. 3 is a block diagram of an example mapping of virtual memory pages to physical memory.

As shown in FIG. 2, computing device 202 may also include physical memory 216. Physical memory 216 generally represents any type or form of physical computing memory that has the rowhammer DRAM bug or is vulnerable to bit flipping. In some examples, computing device 202 may enable virtual machines to use physical memory 216 by allocating virtual memory (i.e., a virtual address space), which is backed by physical memory 216, for each of the virtual machines that it hosts. For example, computing device 202 may allocate virtual memory 208 for malicious virtual machine 204 and virtual memory 212 for benign virtual machine 210. Computing device 202 may manage the storage of data to virtual memory using pages, such as page 208 and page 214. As used herein, the terms "page" and "page of virtual memory" generally refer to any contiguous block of virtual memory. A page of virtual memory may be mapped to a page frame of physical memory and may be transferred between physical memory and external page storage when not needed. When a virtual machine reads data from or writes data to a page of virtual memory, computing device 202 may read the data from or write the data to the page frame to which the page of virtual memory has been mapped. The term "page frame" as used herein, generally refers to any contiguous block of physical memory or a unit of storage of physical memory that is used to store a virtual-memory page in active memory. FIG. 3 illustrates how page 208 and page 214 may be initially mapped to physical memory 216. In this example, page 208 may be stored to page frame 218, and page 214 may be stored to page frame 220.

In some situations, two or more virtual machines may have pages of virtual memory that contain identical data. For example, in some situations, page 208 and page 214 may contain identical data. In these situations, the page frames of physical memory that store the pages of virtual memory may also store identical data, and computing device 202 may perform memory de-duplication in order to reduce the amount of physical memory that is utilized. As used herein, the term "de-duplication" generally refers to the process of reducing redundant data in physical memory by mapping or backing pages of virtual memory that store identical data to a single page frame in physical memory. FIG. 4 illustrates how page 208 and page 214, which contain identical data, may be stored in physical memory 216 after de-duplication is performed on physical memory 216 as shown in FIG. 3. In this example, page 214 may be remapped to page frame 218 such that page 208 and page 214 share page frame 218. In this example, computing device 202 may mark page frame 218 as read-only memory when page frame 218 is shared. Point 602 on exemplary timeline 600 in FIG. 6 may represent a point in time when the mapping of physical memory 216 transitions from the mapping shown in FIG. 3 to the mapping shown if FIG. 4.

Figure 5:
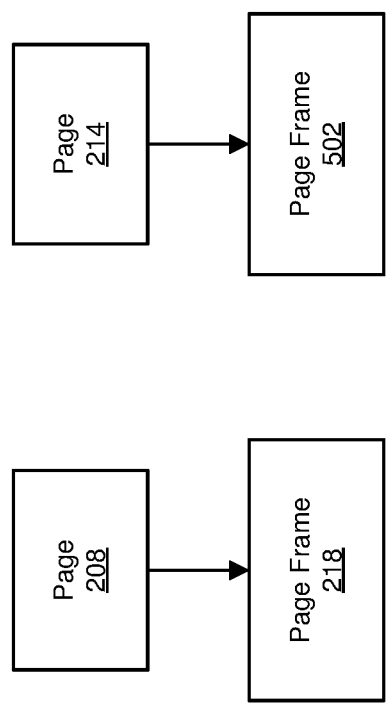
FIG. 5 is a block diagram of an example mapping of virtual memory pages to physical memory.
Figure 6:
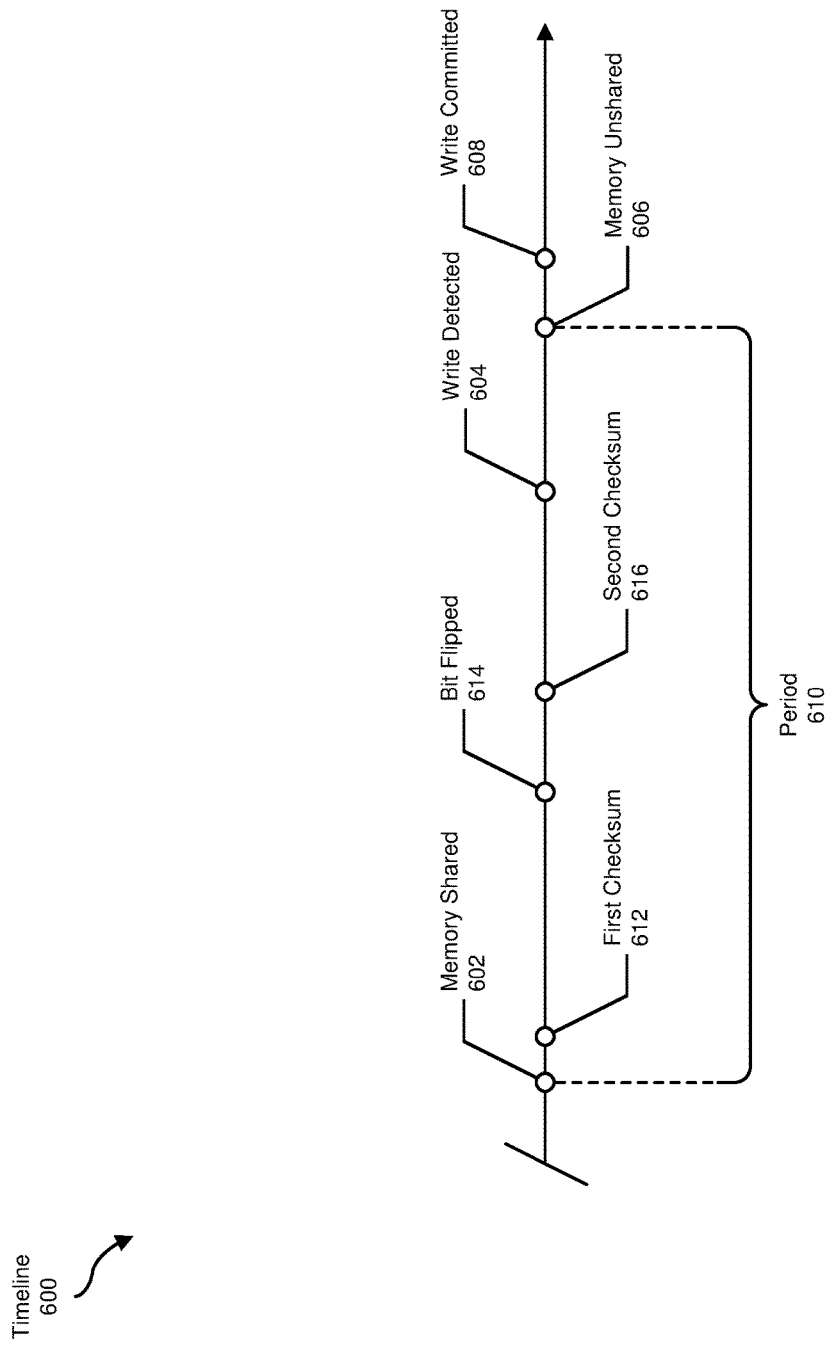
FIG. 6 is a diagram of a representative timeline for detecting modification attacks on shared physical memory.

Computing device 202 may handle future writes to a page of virtual memory that is mapped to a shared page frame using a copy-on-write mechanism that maps the page of virtual memory to a new duplicate page frame to which the data may be written. FIG. 5 illustrates how a write to page 214 may be handled when page 208 and page 214 are sharing page frame 218 as shown in FIG. 4. In this example, computing device 202 may, upon detecting a write to page 214, allocate a new page frame 502 that is a duplicate of page frame 218, map page 214 to page frame 502, and then commit the write to page 214 by committing the write to page frame 502. Point 604 on exemplary timeline 600 in FIG. 6 may represent a point in time when a write was detected to page 214 when page 214 was mapped to page frame 218 as shown in FIG. 4. Point 606 on exemplary timeline 600 in FIG. 6 may represent a point in time when the mapping of physical memory 216 transitions from the mapping shown in FIG. 4 to the mapping shown if FIG. 5. Point 608 on exemplary timeline 600 in FIG. 6 may represent a point in time when the write is committed to page 214 when page 214 is mapped to page frame 502 as shown in FIG. 5.

Figure 7:
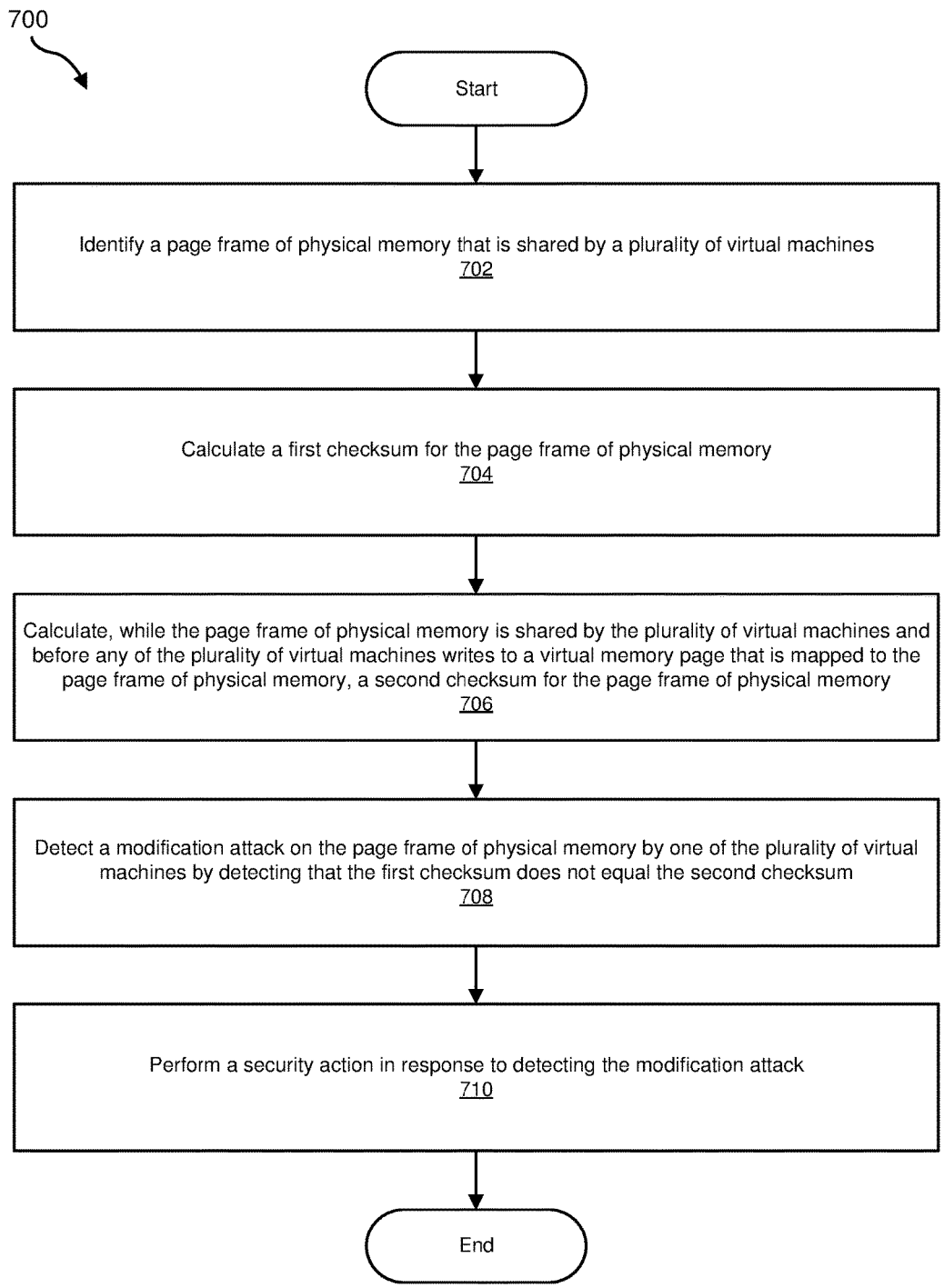
FIG. 7 is a flow diagram of an example method for detecting modification attacks on shared physical memory.

FIG. 7 is a flow diagram of an example computer-implemented method 700 for detecting modification attacks on shared physical memory. The steps shown in FIG. 7 may be performed by any suitable computer-executable code and/or computing system, including system 100 in FIG. 1, system 200 in FIG. 2, and/or variations or combinations of one or more of the same. In one example, each of the steps shown in FIG. 7 may represent an algorithm whose structure includes and/or is represented by multiple sub-steps, examples of which will be provided in greater detail below.

As illustrated in FIG. 7, at step 702 one or more of the systems described herein may identify a page frame of physical memory that is shared by a plurality of virtual machines. For example, identifying module 104 may, as part of computing device 202 in FIG. 2, identify page frame 218 of physical memory 216 that is shared by virtual machines 204 and 210 (as shown in FIG. 4).

The systems described herein may perform step 702 in any suitable manner. In some examples, identifying module 104 may identify a shared page frame of physical memory by querying a list of shared or merged page frames that is maintained by a memory de-duplication module. In at least one example, identifying module 104 may identify a shared page frame of physical memory as part of the memory de-duplication module as the memory de-duplication module de-duplicates page frames in physical memory. Using FIGS. 3 and 4 as an example, identifying module 104 may identify page frame 218 as a shared page frame by (1) scanning physical memory 216 for two or more page frames that contain the same data, (2) detecting that page frame 218 and page frame 220 contain the same data, (3) sharing page frame 218 between virtual machine 204 and virtual machine 210 by remapping page 214 to page frame 218 (as shown in FIGS. 4), and (4) adding page frame 218 to a list of page frames that are shared (e.g., a stable tree used by Kernel Same-page Merging (KSM)). Additionally or alternatively, identifying module 104 may identify a shared page frame of physical memory as part of a copy-on-write module while the copy-on-write module monitors writes to shared page frames.

At step 704, one or more of the systems described herein may calculate a first checksum for the page frame. For example, calculating module 106 may, as part of computing device 202 in FIG. 2, calculate checksum 120 for page frame 218.

The systems described herein may perform step 704 in any suitable manner. In general, calculating module 106 may calculate checksums for page frames using any suitable hash function that takes as input the contents of a page frame. In some examples, calculating module 106 may derive an initial checksum for a page frame as part of a memory de-duplication module. For example, a memory de-duplication module may identify duplicate page frames in physical memory by comparing checksums derived by each page frame in physical memory and by identifying page frames with the same checksums. In some examples, calculating module 106 may retain the checksum that was calculated by the de-duplication module. Additionally or alternatively, calculating module 106 may derive an initial checksum for a page frame as part of a copy-on-write handler. In this example, calculating module 106 may calculate an initial checksum for a page frame as soon as the copy-on-write handler begins monitoring writes to pages of virtual memory that are mapped to the page frame.

Calculating module 106 may calculate a first checksum at various points in time. For example, calculating module 106 may calculate a checksum for a page frame at the point in time when the page frame is initially shared (e.g., point 602 in FIG. 6). Additionally or alternatively, calculating module 106 may calculate a checksum for a page frame at any point in time after the page frame is first shared until the page frame is no longer being shared (e.g., any point in time during period 610 in FIG. 6 such as at point 612).

At step 706, one or more of the systems described herein may calculate, while the page frame is shared by the plurality of virtual machines and before any of the plurality of virtual machines writes to a page of virtual memory that is mapped to the page frame, a second checksum for the page frame. For example, calculating module 106 may, as part of computing device 202 in FIG. 2, calculate, while page frame 218 is shared by virtual machines 204 and 210 and before virtual machine 204 writes to page 208 that is mapped to page frame 218 or virtual machine 210 writes to page 214 that is also mapped to page frame 218 (as shown in FIG. 4), a second checksum 122 for page frame 218.

The systems described herein may perform step 706 in any suitable manner. In general, after a first checksum for a page frame is calculated at step 704, calculating module 106 may periodically calculate additional checksums for the page frame using the same methods that were used at step 704. In some examples, calculating module 106 may calculate an additional checksum for a page frame after a predetermined amount of time has passed. Additionally or alternatively, calculating module 106 may calculate an additional checksum for a page frame after the page frame has been accessed a predetermined number of times. Calculating module 106 may calculate a second checksum for a shared page frame at various points in time. For example, calculating module 106 may calculate a checksum for a page frame at any point in time after the page frame is first shared until the page frame is no longer being shared (e.g., any point in time during period 610 in FIG. 6 such as at point 616).

At step 708, one or more of the systems described herein may detect a modification attack on the page frame by one of the plurality of virtual machines by detecting that the first checksum does not equal the second checksum. For example, detecting module 108 may, as part of computing device 202 in FIG. 2, detect a modification attack on page frame 218 by either virtual machine 204 or virtual machine 210 by detecting that checksum 120 does not equal checksum 122.

In general, the systems described herein may consider the difference of two checksums that were derived from the same data as an indication that the data has changed. Moreover, the systems described herein may consider any change to the contents of a shared page frame as a change caused by a modification attack such as a rowhammer attack. As such, detecting module 108 may detect a modification attack on a shared page frame by simply comparing two checksums that were derived from the contents of the page frame during a period of time when the page frame should not have been written to (e.g., time period 610 in FIG. 6). Using FIG. 6 as an example, detecting module 108 may detect a modification attack, which may be a rowhammer attack, that induced a bit flip in page frame 218 during period 610 (e.g., the bit flipped at point 614) by simply comparing the two checksums that were derived from the contents of page frame 218 before and after the bit flip occurred (e.g., the checksums taken at points 612 and 616).

At step 710, one or more of the systems described herein may perform a security action in response to detecting the modification attack. For example, security module 110 may, as part of computing device 202 in FIG. 2, perform a security action in response to detecting a modification attack involving page frame 218.

The systems described herein may perform a variety of security actions in response to the detection of a modification attack on a page frame of physical memory. In one example, security module 110 may attempt to prevent the modification attack from continuing or succeeding by shutting down each virtual machine that shares the page frame. Alternatively, security module 110 may allow each of the virtual machines to continue to run but may carefully monitor each virtual machine for rowhammer-attack behaviors. In one example, if a virtual machine shows signs of modification-attack behaviors (such as known rowhammer-attack behaviors), security module 110 may shut down the virtual machine.

In some examples, security module 110 may attempt to prevent the modification attack from continuing or succeeding by unsharing the page frame. In some examples, security module 110 may prevent future modification attacks by preventing each virtual machine that shared the page frame when the modification attack was detected from subsequently sharing physical memory with any other virtual machine (e.g., by assigning each virtual machine to a group of untrusted virtual machines that cannot share physical memory with other more trusted virtual machines).

Since many virtual machines may be sharing a page frame of physical memory when a modification attack on the page frame is detected, the perpetrator of the modification attack may be any one of the virtual machines. As such, in some examples, security module 110 may flag each virtual machine that shares an attacked physical memory page as a possible perpetrator and/or flag each virtual machine for further forensic examination. Upon completion of step 710, exemplary method 700 in FIG. 7 may terminate.

As explained above, by periodically calculating checksums of the read-only contents of a shared page frame in physical memory (i.e., a page frame in physical memory that is shared by multiple virtual machines and that has been marked as read-only memory) to monitor the shared page frame for changes caused by rowhammer-induced bit flips, the systems and methods described herein may enable the detection of modification attacks. Furthermore, in some examples, by detecting bit flips in shared page frames in physical memory soon after the bit flips occur, these systems and methods may perform various security actions that may prevent in-progress modification attacks from being carried out successfully.

Figure 8:
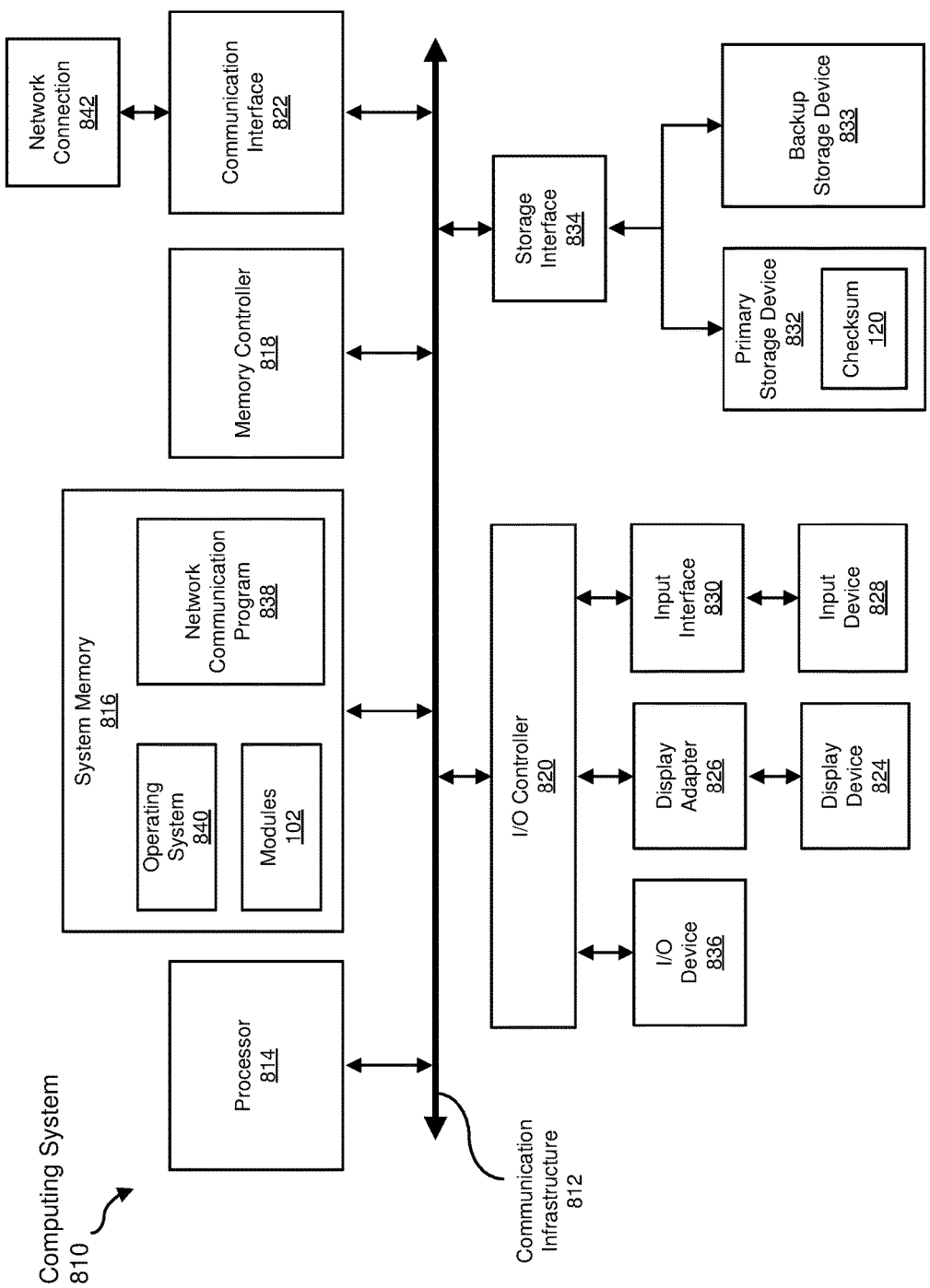
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 7). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, one or more checksums (e.g., checksum 120 from FIG. 1) may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
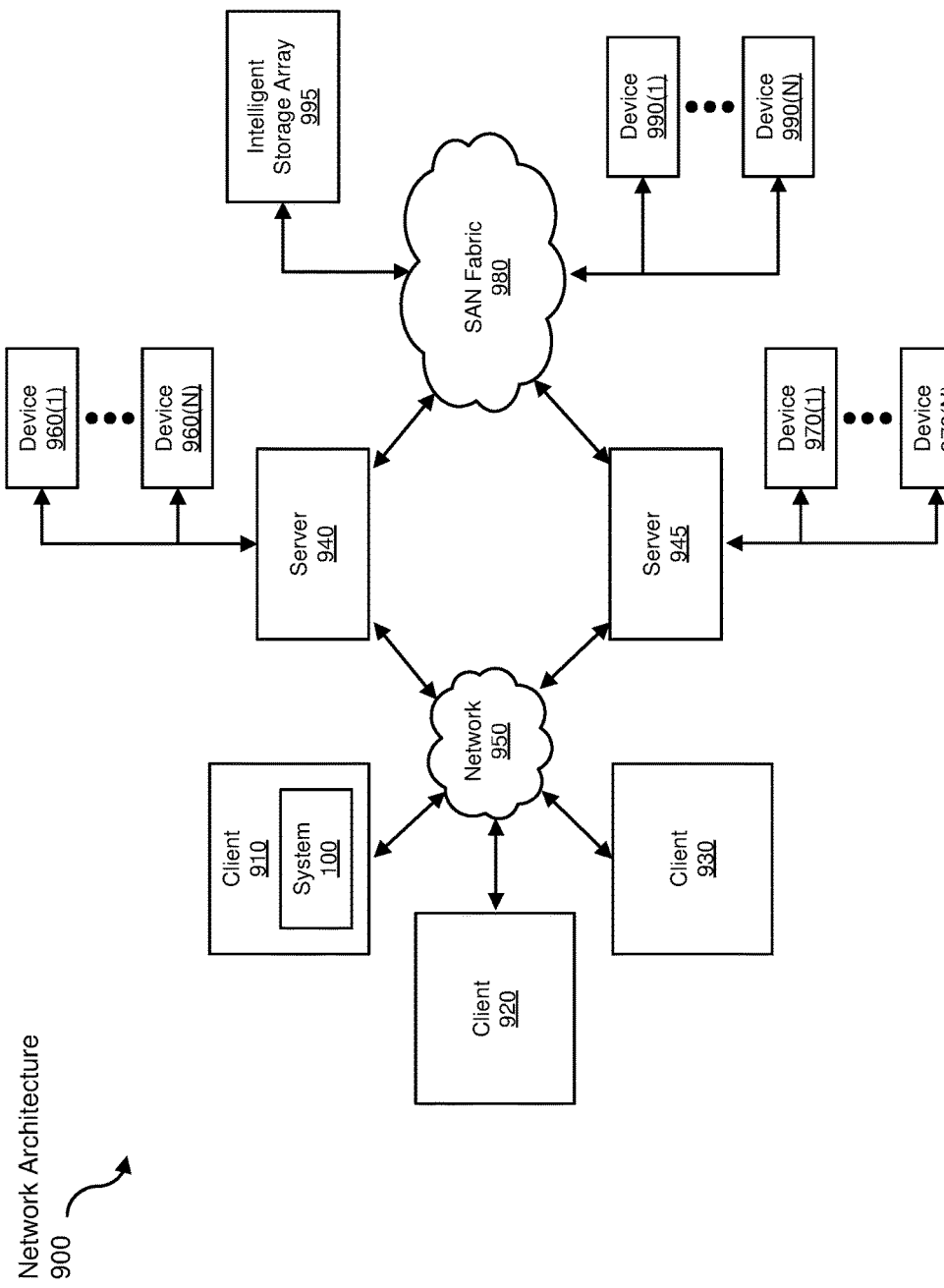
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 7). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for detecting modification attacks on shared physical memory.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a shared page frame of physical memory to be transformed, transform the contents of the shared page frame into a first checksum, subsequently transform the contents of the shared page frame into a second checksum, output the first and second checksums to a system for detecting modification attacks, use the first and second checksums to detect a modification attack, and store the first and/or second checksums to a system for storing checksums. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting modification attacks on shared physical memory, at least a portion of the method being performed by a computing device comprising at least one processor, the method comprising:
identifying a page frame of physical memory that physically stores data and is shared by a plurality of virtual machines, wherein:
a page of virtual memory of each of the plurality of virtual machines contains the data and is mapped to the page frame;
the plurality of virtual machines have simultaneous read-only access to the page frame; and
a copy-on-write mechanism remaps, when one of the plurality of virtual machine attempts to write additional data to the page of virtual memory of the one of the plurality of virtual machines, the page of virtual memory of the one of the plurality of virtual machines to an additional page frame of the physical memory before writing the additional data to the additional page frame;
calculating, while the plurality of virtual machines still have simultaneous read-only access to the page frame, a first checksum for the page frame;
calculating, while the plurality of virtual machines still have simultaneous read-only access to the page frame and before any of the plurality of virtual machines writes to a page of virtual memory that is mapped to the page frame, a second checksum for the page frame;
detecting a modification attack on the page frame by one of the plurality of virtual machines by detecting that the first checksum does not equal the second checksum; and
performing a security action in response to detecting the modification attack.

2. The computer-implemented method of claim 1, wherein performing the security action comprises flagging each of the plurality of virtual machines as a possible perpetrator of the modification attack.

3. The computer-implemented method of claim 1, wherein performing the security action comprises flagging each of the plurality of virtual machines for forensic examination.

4. The computer-implemented method of claim 1, wherein performing the security action comprises shutting down each of the plurality of virtual machines.

5. The computer-implemented method of claim 1, wherein performing the security action comprises unsharring the page frame.

6. The computer-implemented method of claim 1, wherein performing the security action comprises preventing each of the plurality of virtual machines from sharing physical memory with any other virtual machine.

7. The computer-implemented method of claim 1, wherein performing the security action comprises assigning each of the plurality of virtual machines to a group of untrusted virtual machines that cannot share physical memory with trusted virtual machines.

8. The computer-implemented method of claim 1, wherein performing the security action comprises monitoring each of the plurality of virtual machines for rowhammer-attack behaviors.

9. The computer-implemented method of claim 1, wherein the step of calculating the first checksum is performed as part of de-duplicating the page frame.

10. The computer-implemented method of claim 1, wherein the page frame is subject to copy-on-write divergence while the page frame is shared by the plurality of virtual machines.

11. A system for detecting modification attacks on shared physical memory, the system comprising:
an identifying module, stored in memory, that identifies a page frame of physical memory that physically stores data and is shared by a plurality of virtual machines, wherein:
a page of virtual memory of each of the plurality of virtual machines contains the data and is mapped to the page frame;
the plurality of virtual machines have simultaneous read-only access to the page frame; and
a copy-on-write mechanism remaps, when one of the plurality of virtual machine attempts to write additional data to the page of virtual memory of the one of the plurality of virtual machines, the page of virtual memory of the one of the plurality of virtual machines to an additional page frame of the physical memory before writing the additional data to the additional page frame;
a calculating module, stored in memory, that:

calculates, while the plurality of virtual machines still have simultaneous read-only access to the page frame, a first checksum for the page frame; and calculates, while the plurality of virtual machines still have simultaneous read-only access to the page frame and before any of the plurality of virtual machines writes to a page of virtual memory that is mapped to the page frame, a second checksum for the page frame;

a detecting module, stored in memory, that detects a modification attack on the page frame by one of the plurality of virtual machines by detecting that the first checksum does not equal the second checksum;

a security module, stored in memory, that performs a security action in response to detecting the modification attack; and at least one physical processor that executes the identifying module, the calculating module, the detecting module, and the security module.

12. The system of claim 11, wherein the security module performs the security action by flagging each of the plurality of virtual machines as a possible perpetrator of the modification attack.

13. The system of claim 11, wherein the security module performs the security action by flagging each of the plurality of virtual machines for forensic examination.

14. The system of claim 11, wherein the security module performs the security action by shutting down each of the plurality of virtual machines.

15. The system of claim 11, wherein the security module performs the security action by unsharing the page frame.

16. The system of claim 11, wherein the security module performs the security action by preventing each of the plurality of virtual machines from sharing physical memory with any other virtual machine.

17. The system of claim 11, wherein the security module performs the security action by assigning each of the plurality of virtual machines to a group of untrusted virtual machines that cannot share physical memory with trusted virtual machines.

18. The system of claim 11, wherein the security module performs the security action by monitoring each of the plurality of virtual machines for rowhammer-attack behaviors.

19. The system of claim 11, wherein the calculating module calculates the first checksum as part of de-duplicating the page frame.

20. A non-transitory computer-readable medium comprising one or more computer-executable instructions that, when executed by at least one processor of a computing device, cause the computing device to:

identify a page frame of physical memory that physically stores data and is shared by a plurality of virtual machines, wherein:
- a page of virtual memory of each of the plurality of virtual machines contains the data and is mapped to the page frame;
- the plurality of virtual machines have simultaneous read-only access to the page frame; and
- a copy-on-write mechanism remaps, when one of the plurality of virtual machine attempts to write additional data to the page of virtual memory of the one of the plurality of virtual machines, the page of virtual memory of the one of the plurality of virtual machines to an additional page frame of the physical memory before writing the additional data to the additional page frame;

calculate, while the plurality of virtual machines still have simultaneous read-only access to the page frame, a first checksum for the page frame;

calculate, while the plurality of virtual machines still have simultaneous read-only access to the page frame and before any of the plurality of virtual machines writes to a page of virtual memory that is mapped to the page frame, a second checksum for the page frame;

detect a modification attack on the page frame by one of the plurality of virtual machines by detecting that the first checksum does not equal the second checksum; and perform a security action in response to detecting the modification attack.

\* \* \* \* \*